United States Patent
Antonatos et al.

(10) Patent No.: US 10,095,883 B2
(45) Date of Patent: Oct. 9, 2018

(54) METHOD/SYSTEM FOR THE ONLINE IDENTIFICATION AND BLOCKING OF PRIVACY VULNERABILITIES IN DATA STREAMS

(71) Applicant: International Business Machines Corporation, Armonk, NY (US)

(72) Inventors: Spyridon Antonatos, Blanchardstown (IE); Stefano Braghin, Blanchardstown (IE); Aris Gkoulalas-Divanis, Waltham, MA (US); Olivier Verscheure, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 15/217,262

(22) Filed: Jul. 22, 2016

(65) Prior Publication Data
US 2018/0025179 A1   Jan. 25, 2018

(51) Int. Cl.
G06F 21/62 (2013.01)
G06F 17/30 (2006.01)
G06F 9/455 (2018.01)

(52) U.S. Cl.
CPC ...... *G06F 21/6254* (2013.01); *G06F 9/45558* (2013.01); *G06F 17/30321* (2013.01); *G06F 2009/45587* (2013.01)

(58) Field of Classification Search
CPC ............. G06F 21/6254; G06F 11/3006; G06F 17/30321
See application file for complete search history.

(56) References Cited

U.S. PATENT DOCUMENTS 7,076,065 B2   7/2006   Sherman et al.
7,539,682 B2   5/2009   Rubin et al.
(Continued)

FOREIGN PATENT DOCUMENTS

WO   2001037097 A1   5/2001

OTHER PUBLICATIONS

S.M. Samuels, "A bayesian, species-sampling-inspired approach to the uniques problem in micro-data disclosure risk assessment", Journal of Official Statistics, 14(4), 1998, pp. 1-16.
(Continued)

*Primary Examiner* — Robert B Leung
(74) *Attorney, Agent, or Firm* — Scully, Scott, Murphy & Presser, PC; Kurt P. Goudy, Esq.

(57) ABSTRACT

A method and system for automatically identifying and protecting privacy vulnerabilities in data streams includes indexing data values for each attribute of the data stream received by local virtual machines based on a schema of each data stream, classifying the data attributes of the plurality of data streams into known data types, integrating the local virtual machine indexes into a global index data structure for the data streams including single attribute data values, identifying privacy vulnerabilities in the data as attributes that are direct identifiers based on the attribute data values stored in the global index and combinations of attributes that are quasi-identifiers based on the low frequency of certain combinations of attribute data value pairs by computing the frequency based on the single attribute data values stored in the global index and providing privacy protection to the data streams by applying data transformations on the discovered direct identifiers and the quasi-identifiers.

20 Claims, 7 Drawing Sheets

(56) References Cited

U.S. PATENT DOCUMENTS

| | | | |
|---|---|---|---|
| 8,429,758 | B2 | 4/2013 | Chen et al. |
| 8,812,524 | B2 | 8/2014 | Chen et al. |
| 9,137,163 | B2 | 9/2015 | Perryman et al. |
| 2007/0233711 | A1 | 10/2007 | Aggarwal et al. |
| 2012/0054821 | A1 | 3/2012 | Roy et al. |
| 2013/0132473 | A1* | 5/2013 | Hawkins ............ G06F 21/6218 709/204 |
| 2013/0198194 | A1* | 8/2013 | Chen ................. G06F 17/30539 707/740 |
| 2014/0130178 | A1 | 1/2014 | Agrawal et al. |
| 2014/0096261 | A1 | 4/2014 | Boldyrev et al. |
| 2014/0122442 | A1* | 5/2014 | Takenouchi .......... G06F 21/556 707/687 |
| 2014/0123304 | A1 | 6/2014 | Rachlin et al. |
| 2014/0189858 | A1 | 7/2014 | Chen et al. |
| 2015/0007249 | A1* | 1/2015 | Bezzi ................. G06F 21/6254 726/1 |
| 2015/0026181 | A1* | 1/2015 | Milton ............... G06Q 30/0269 707/737 |

OTHER PUBLICATIONS

A. Takemura, Y. Endo, "Evaluation of per-record identification risk and swap-ability of records in a microdata set via decomposable models", arXiV CORR, Mar. 2006, pp. 1-12.

P. Yiapanis, "Parallel mining of minimal sample unique itemsets", MS Thesis, University of Manchester, UK, 2007, pp. 1-142.

P. Yiapanis, D.J. Haglin, A.M. Manning, et al., "Variable-grain and dynamic work generation for minimal unique itemset mining", IEEE Conference on Cluster Computing, 2008, pp. 1-9.

D.J. Haglin, K.R. Mayes, A.M. Manning, et al., "Factors affecting the performance of parallel mining of minimal unique itemsets on diverse architectures", Concurrency and Computation: Practice and Experience, Wiley, 2009, pp. 1131-1158.

A. Gupta, A. Mittal, A. Bhattacharya, "Minimally infrequent itemset mining using pattern-growth paradigm and residual trees", International Conference on Management of Data (COMAD), 2011, pp. 1-12.

L. Cagliero, P. Garza, "Infrequent weighted itemset mining using frequent pattern growth", IEEE Transactions on Knowledge and Data Engineering, Apr. 2014, pp. 903-915.

J. Cao, B. Carminati, E. Ferrari, K.-K. Tan, "CASTLE: Continuously Anonymizing Data Streams", IEEE Transactions on Dependable and Secure Computing, 8(3), Jun. 2011, pp. 337-352.

B. Zhou, Y. Han, J. Pei, B. Jiang, Y. Tao, Y. Jia, "Continuous privacy-preserving publishing of data streams", ACM EDBT 2009, pp. 1-12.

J. Zhang, J. Yang, J. Zhang, Y. Yuan, "KIDS: K-anonymization of data streams based on sliding windows", IEEE Conference on Future Computer and Communication, 2010, pp. V2-311-V2-316.

LeFevre et al., "Mondrian Multidimensional K-Anonymity", ICDE, Apr. 2006, pp. 1-12.

* cited by examiner

METHOD/SYSTEM FOR THE ONLINE IDENTIFICATION AND BLOCKING OF PRIVACY VULNERABILITIES IN DATA STREAMS

BACKGROUND OF THE INVENTION

This disclosure is directed to method and system for identification and blocking of privacy vulnerabilities in data streams.

Due to worldwide and local privacy regulations, such as the EU Data Privacy Act and the US HIPAA guidelines, person-specific data have to be properly de-identified before being shared with third parties.

Several real-world cases require the privacy protection of voluminous streaming data. As an example, modern health-related information systems are being designed to handle real-time person-specific data, which are either provided directly by patients or through sensors connected to the patients, and to offer such data with a small delay to different data consumers, still being compliant with existing data privacy regulations and state-of-the-art privacy offerings.

Existing privacy solutions are not designed to handle the anonymization of such massive and fast datasets in a streaming and online fashion, against the various types of privacy vulnerabilities that they may contain. Furthermore, discovering the privacy vulnerabilities in such datasets is a non-trivial task which requires new approaches.

Existing algorithms for the identification of vulnerabilities (in the form of sample uniques) in relational tables are either too slow, cannot scale to medium datasets (in terms of columns/rows), or require a prohibitively large amount of memory to operate. They are also inapplicable in the case of data streams, as they require access to the entire dataset.

SUMMARY OF THE INVENTION

One embodiment is directed to a method for automatically identifying and protecting privacy vulnerabilities in a plurality of data streams of data records received by a plurality of virtual machines. The method includes receiving at least one data stream at each local virtual machine, the data stream including data values for a plurality of attributes; indexing the data values for each attribute of the at least one data stream received by each local virtual machine based on a schema of each data stream; integrating by a main virtual machine the local virtual machine indexes into a global index data structure for the plurality of data streams, the global index data structure including single attribute data values; identifying privacy vulnerabilities in the data as: attributes that are direct identifiers based on the attribute data values stored in the global index data structure; combinations of attributes that are quasi-identifiers based on the low frequency of certain combinations of attribute data value pairs by computing the frequency based on the single attribute indexing information stored in the global index data structure; and providing privacy protection to the data streams by applying data transformations on the discovered direct identifiers and the quasi-identifiers. The method may further include classifying the data attributes of the plurality of data streams into known data types, the classification being performed either before identifying the privacy vulnerabilities in the data, or after identifying the privacy vulnerabilities in the data. The method may also include where the privacy protection for the direct identifiers in the data stream is provided by applying relevant masking providers to the data based on the data type to which they were assigned in the data type classification.

One embodiment is directed to a system including at least one data processor connected to at least one memory that stores software instructions, where execution of the software instructions by the at least one data processor causes the system to automatically identify and protect privacy vulnerabilities in a plurality of data streams of data records received by a plurality of virtual machines by: receiving at least one data stream at each local virtual machine, the data stream including data values for a plurality of attributes; indexing the data values for each attribute of the at least one data stream received by each local virtual machine based on a schema of each data stream; integrating by a main virtual machine the local virtual machine indexes into a global index data structure for the plurality of data streams, the global index data structure including attribute data values and combinations of attribute data value pairs; identifying privacy vulnerabilities in the data as: attributes that are direct identifiers based on the attribute data values stored in the global index data structure; combinations of attributes that are quasi-identifiers based on the low frequency of certain combinations of attribute data value pairs stored in the global index data structure; and providing privacy protection to the data streams by applying data transformations on the discovered direct identifiers and the quasi-identifiers.

One embodiment is directed to a computer program product including software instructions on a non-transitory computer-readable medium, where execution of the software instructions using a computer causes the computer to automatically identify and protect privacy vulnerabilities in a plurality of data streams of data records received by a plurality of virtual machines by: receiving at least one data stream at each local virtual machine, the data stream including data values for a plurality of attributes; indexing the data values for each attribute of the at least one data stream received by each local virtual machine based on a schema of each data stream; integrating by a main virtual machine the local virtual machine indexes into a global index data structure for the plurality of data streams, the global index data structure including attribute data values and combinations of attribute data value pairs; identifying privacy vulnerabilities in the data as: attributes that are direct identifiers based on the attribute data values stored in the global index data structure; combinations of attributes that are quasi-identifiers based on the low frequency of certain combinations of attribute data value pairs stored in the global index data structure; providing privacy protection to the data streams by applying data transformations on the discovered direct identifiers and the quasi-identifiers; and classifying the data attributes of the plurality of data streams into known data types, the classification being performed either before identifying the privacy vulnerabilities in the data, or after identifying the privacy vulnerabilities in the data.

DETAILED DESCRIPTION OF PREFERRED EMBODIMENTS

This disclosure is directed to an online method and system for the automated discovery and blocking of privacy vulnerabilities in voluminous data streams, designed to operate in a massively parallel environment. In one embodiment, the method and system discovers privacy vulnerabilities, such as direct identifiers, quasi-identifiers, outliers etc., in datasets, classifies the incoming data values into known data types and selects the appropriate privacy provider to protect them, and applies the selected privacy providers to block all the discovered privacy vulnerabilities.

The method and system disclosed herein is computationally and memory efficient, for identifying and blocking privacy vulnerabilities in the context of large data streams. The method and system can scale to massively parallel data streams, while operating in a cloud environment.

The system and method can leverage a massively distributed architecture to identify and block privacy vulnerabilities, making it a feasible solution to the ever increasing requirements of data protection.

Figure 1:
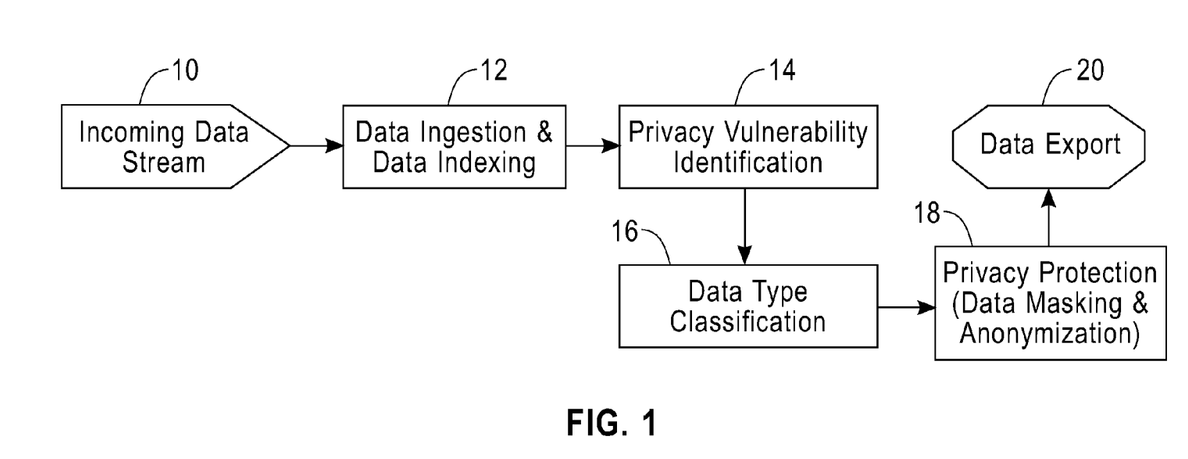
FIG. 1 is a block diagram of one embodiment of the method and system of the present invention according to a first data flow.

In one embodiment of a first data flow, the data type classification follows the privacy vulnerabilities' identification phase, and classifies the single attributes that were found to contain uniques to a known data type. As shown in FIG. 1, an incoming data stream 10 is received by a data ingestion and data indexing module 12. The indexed data is then passed to a privacy vulnerabilities identification module 14. The vulnerability identified data is then passed to a data type classification module 16. The classified data is passed to a privacy protection module 18 and the protected data are then exported at 20.

Figure 2:
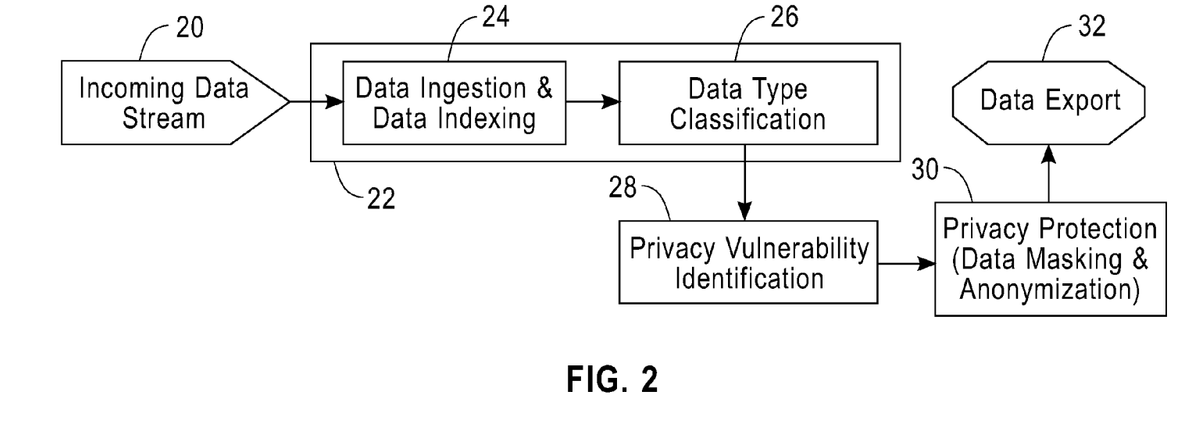
FIG. 2 is a block diagram of one embodiment of the method and system of the present invention according to a second data flow.

In a second embodiment of a second data flow, the data type classification is performed as part of the data ingestion & data indexing phase. An incoming data stream 20 is received by a data indexing and classification module 22. Module 22 includes ingestion and data indexing sub-module 24 and data type classification sub-module 26. The indexed and classified data is then passed to privacy vulnerabilities identification module 28. The vulnerability identified and classified data is then passed privacy protection module 30 and the protected data is the exported at 32.

Figure 3:
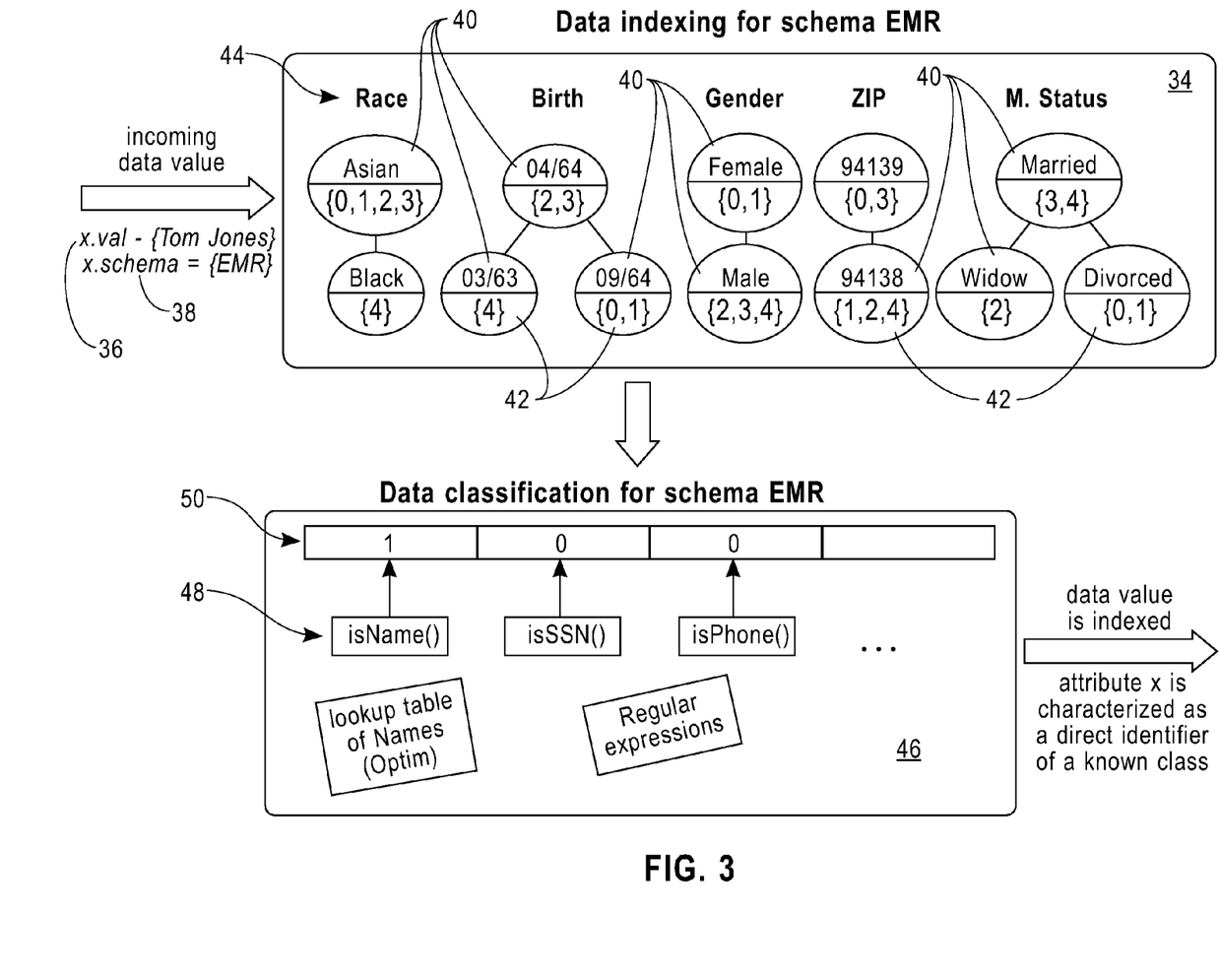
FIG. 3 is a representation of the data indexing and data classification data structures according to one embodiment of the method and system of the present invention.

In the data indexing and classification module 22, incoming data values of the data stream 20 are indexed based on the corresponding schema of the data stream 20. FIG. 3 is an example of data indexing data structure 34 for a partial electronic medical record (EMR) for an individual. The incoming data stream includes the data values and the data schema 38 of the data stream. The indexing data structure 34 includes a hierarchical arrangement of the data attributes 40 and data values 42. The attributes may be organized by categories 44. The indexed data attributes are classified into known data types 48 in classification data structure 46. The 1 in bit line 50 indicates the direct identifier is a name. Subsequently the indexed data values 40, 42 are examined for identifying attributes that are direct identifiers of a privacy vulnerability belonging to a known data type.

Figure 4:
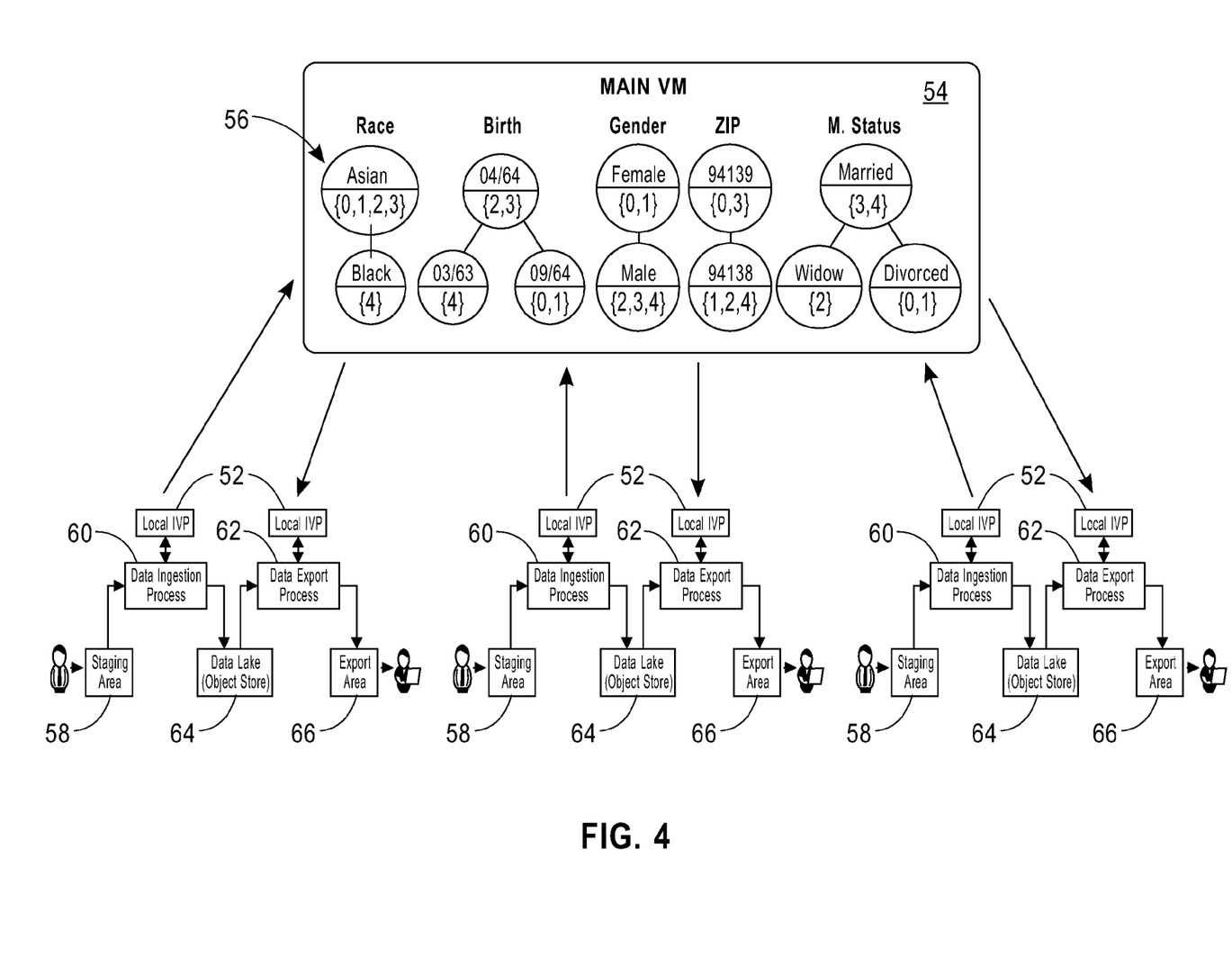
FIG. 4 is a block diagram of the parallel processing of the data indexing process according to one embodiment of the method and system of the present invention.

In one embodiment the data indexing process is performed on parallel data streams. In an online setting, data streams arrive on-the-fly into multiple local virtual machines (VMs) 52 reading data concurrently. This data has to be indexed to support the discovery of privacy vulnerabilities.

Each local VM creates a local data index and these local indexes are used by a main virtual machine 54 to produce a global index 56 for the entire dataset. The computation of the global index 56 can be in a cloud environment where local VMs 52 are replicated as required by the load of the system. This requires special handling of the local indexes of attributes maintained by each local VM 52. In one embodiment, this issue is addressed by using a distributed counter approach that scales according to specific system requirements, also providing formal consistency guarantees.

In one embodiment, a staging area 58 creates a data stream from data records. The data streams are passed to a data ingestion process module 60. Each data ingestion process module 60 communicates with a local VM 52, which maintains a local index and updates the main VM 54 according to the selected strategy. Given that data belonging to different schemas may be sent to the platform at any time, each local VM 52 maintains an index-per-schema for which the corresponding counters are updated.

During a data export the system takes into account that certain data values may have not been indexed yet to the global index held by the main VM 54 or a local VM 52 may have failed to update the main VM 54, and in that case those values are suppressed to guarantee data privacy. The privacy protected data is passed from the main VM 54 to local VM 52 which exports the data through data export process module 62. The data lake 64 is an object store. The data is exported to an expert area module 66, such as a medical team or insurance company.

To support data exports the system needs to maintain the accuracy of the global index, which can be accomplished through the use of one of several strategies. The strategies include updating when a data export is requested, updating every n data-items have been ingested by the VM or updating when the local VM counter is still in the unsafe region, where the counter is one or less {1 . . . k}, where k represents the minimum frequency of any of the possible attribute combinations which does not create a privacy vulnerability. The proposed approach allows for good scalability at a potentially low cost to data utility, depending on the update strategy used for the global index.

In one embodiment, after a data value is read and indexed, the data type classification performed by module 16 or sub-module 26 depending on the data flow, includes, testing whether it can be classified to a set of known classes or data types, corresponding to direct identifiers. Examples of direct identifiers are name, SSN, address, phone, data types from which the identity of the person can be directly determined. The data classification stage uses regular expressions and look-up tables, depending on the privacy provider process, to select an appropriate class and associate it with the input value, or to classify the input value as <UNKNOWN> if such a match cannot be established.

For each data attribute x, a preference order is selected for testing the supported data types, based on the data type that was matched previously for a value in x. When the percentage of data values read so far for x and matched with class y is above a threshold, which can be user specified, class y is associated with attribute x. Remaining values read for x are subsequently assigned to y. If an attribute x is assigned to class y, class y will be the last one checked for matching with any attribute other than x. This, however, does not mean that two attributes cannot be assigned to the same data type (class).

In one embodiment, the privacy vulnerability identification performed by module 18 or module 28, depending on the data flow, includes computing the direct identifiers and quasi-identifiers of a data stream in a massively distributed fashion. After all data values have been indexed by the local VMs and the main VM has been updated to maintain the global index, the next step regards computing the direct and the quasi-identifiers to perform privacy-protection.

Depending on the particular implementation, this can be a simple SQL query submitted to the main VM asking to retrieve:

the single attributes that are associated with a global count of 1 (or less than k in the general case)→these are the direct identifiers.

the stored combinations of attribute-value pairs that are associated with a count of 1 (or less than k in the general case)→these are the quasi-identifiers.

Another option, when data are stored on a per attribute-value basis, rather than on a per record basis, is to apply the following process using the main VM (global index):

for each single attribute appearing in a data schema, submit this attribute to a new VM to compute if it contains unique values. If it does, then this attribute is characterized as a direct identifier.

Check progressively larger combinations of attributes, starting from combinations of size 2, for uniques. When a combination of attributes contains uniques it is a quasi-identifier and no further superset of this combination needs to be examined for uniques. Each combination of attributes can be provided to a new VM to compute if it is a quasi-identifier.

A multitude of data types are supported as part of the data type classification and the data masking phases. The supported data types include: Names, addresses (street address, city, county, precinct, zip code), dates, phone numbers, emails, national IDs (e.g., passport numbers, SSN, Canada's SIN, etc.), credit cards, medical record numbers, health plan beneficiary numbers, vehicle identifiers & license plate numbers, device identifiers and serial numbers, URLs, IP addresses.

Each data masking/privacy provider offers a set of configuration options that allow maintaining data utility during the data masking operation. For example, the system maintains the gender when masking names, the neighborhood when masking street addresses and the domain when masking email addresses.

During the data export phase, for each attribute x characterized as a direct identifier, each export process module processes the values of x using the privacy provider that has been associated with the class y, where x belongs.

In a data export operation, data are read in batches and anonymization is applied to each batch of records (for the quasi-identifier attributes) exported by an export process module. Privacy is guaranteed using this process, while the level of data utility that is achieved directly depends on the batch size and the similarity of the records within each batch.

Figure 8:
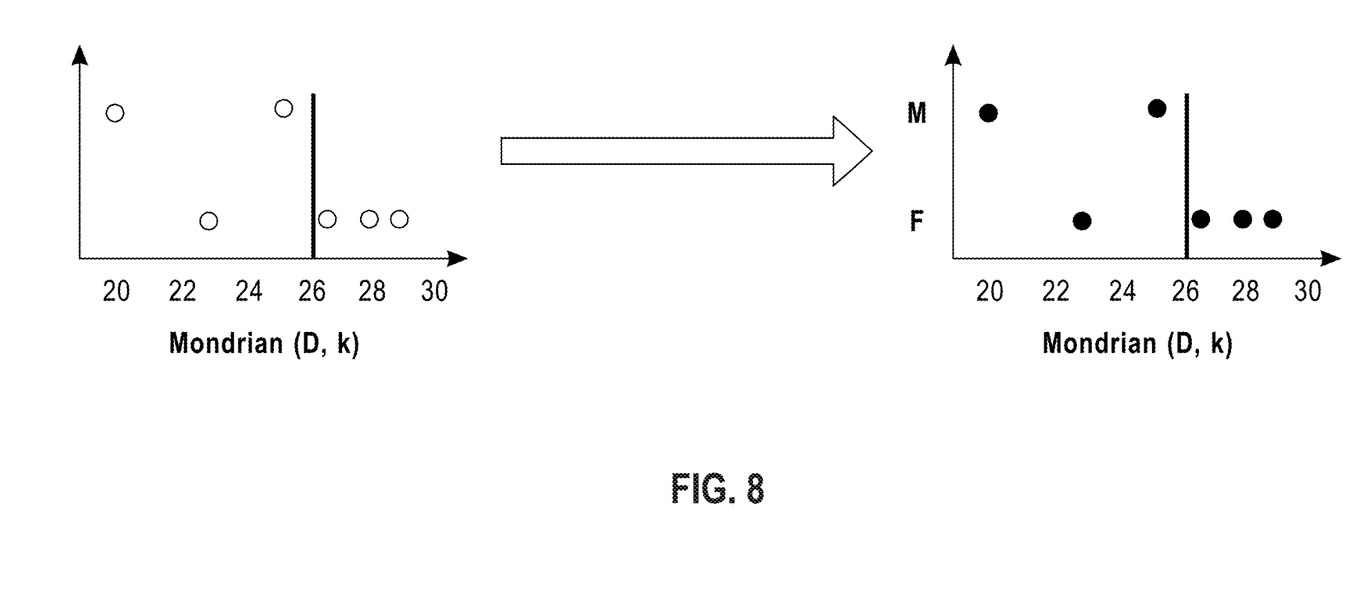
FIG. 8 is a graph of one example of anonymization by applying the Mondrian algorithm.

In one example, data anonymization is applied per batch of records. In this example, quasi-identifier protection can be applied using the Mondrian anonymization algorithm shown in below. The Mondrian algorithm is described in LeFevre et al. Mondrian multidimensional k-anonymity, ICDE, 2006. In one example, the Mondrian algorithm is applied as follows:

Mondrian (D,k)
Find the QID attribute Q with the largest domain
Find the median $\mu$ of Q
Create subspace S with all records of D whose value in Q is less than $\mu$
Create subspace S' with all records of D whose value in Q is at least $\mu$
If $|S| \geq k$ or $|S'| \geq k$
Return Mondrian(S,k) U Mondrian(S' ,k)
Else Return D (update DB)
See FIG. 8.

In one embodiment, the data ingestion process module 60 includes a data ingestion and indexing phase, where incoming data values of the data stream are indexed by the local VMs 52 they were read from, based on the schema to which they belong. The index maintains all distinct values read for an attribute belonging to a schema and the associated records to which each value appears and a data type classification phase, where incoming data values of the stream are processed and potentially classified into known data types. When a sufficient number of data values belonging to the same schema and attribute of the data have been classified to the same data type, the entire attribute in this schema is classified to this known data type (or class).

In one embodiment, the data export process module 62 includes a privacy vulnerabilities' identification phase, where different types of privacy vulnerabilities such as direct identifiers and quasi-identifiers, are discovered in the data steam. This is achieved by main VM 54 integrating the local indexes of the local VMs 52 into a global index structure for the entire data stream (as read so far), and by computing privacy vulnerabilities based on attribute-values (for exposing direct identifiers) or combinations of attribute-value pairs (for exposing quasi-identifiers) that are unique or appear less than a frequency threshold in the data. The export process module 62 also includes a privacy protection phase for the data records that are to be exported, consisting of a data masking and a data anonymization stage, where (a) in the data masking stage, the discovered direct identifiers in the data stream are masked using a privacy provider that applies to data of the data type to which they were assigned in the data type classification phase; and (b) in the data anonymization stage, the discovered quasi-identifiers are anonymized through data generalization and data suppression operations applied on batches of records held by different VMs 52, to offer k-anonymity or l-diversity.

In one embodiment, each local VM 52 may receive incoming data from a data stream either in a per-record basis (i.e., when an entire record is received as input) or in a per attribute-value basis (where an attribute-value associated with a record is received as input). Where data streams read in a per-record basis, they are split into attribute-value pairs and attribute-value pair combinations (as appearing in incoming records), are hashed and subsequently indexed by the VMs to offer HIPAA compliance. A VM that is not assigned to reading incoming data from a data stream is characterized as the main VM 54 and holds the global index of the data stream (read so far) by integrating the indexes of the local VMs 52.

The global index of the data stream (read so far) held by the main VM 54 is updated by using one of the following strategies: (a) each local VM 52 issues an update request every time it reads a certain number of data values, (b) each local VM 52 issues an update request for every read data value that is still in the unsafe region (i.e., is associated with a counter that has a value in 1 ... k), and (c) a data export has been requested, at which time the main VM 54 requests the local indexes from all local VMs 52 to update the global index.

In one embodiment, the data type classification stage includes a set of classifiers, each aiming to recognize a specific data type to which a data value may belong (e.g., name, SSN, address, phone, etc.) A preference order is selected for testing an incoming data value against the different known data types, based on the data type that was selected previously for a data value of the same schema and attribute.

In one embodiment of the privacy vulnerabilities' identification phase, a number of local VMs 52 are spawned, each of which (a) is assigned a set of attributes belonging to a schema, (b) has access to the global index part corresponding to these attributes, and (c) is responsible for computing the direct identifiers and quasi-identifiers that are related to the corresponding attributes. Each local VM 52 that is assigned a set of attributes A to check for direct identifiers and quasi-identifiers starts by checking each single attribute in A for being a direct identifier and for those attributes in A that are not direct identifiers (set B) it applies the following process. The local VM 52 checks progressively larger combinations of attributes in B (starting from a size of 2 and moving up to |B|, if necessary) for values that belong to a unique (or few/rare) records of the data stream. When this holds, the corresponding combination is characterized as a quasi-identifier and it is removed from further consideration (i.e., the corresponding attributes are removed from B). If this does not hold for a certain combination of attributes from B, the combination is expanded with another attribute from B and the new combination is checked for being a quasi-identifier. The process ends when B is empty.

In one embodiment of the data export part, a set of utility-preserving data masking providers are applied to the direct identifiers that appear in the data records that have been selected to be exported. For each direct identifier, a corresponding (to the data type) utility-preserving data masking provider is applied, after being configured accordingly to preserve the utility of the masked data based on the intended use. Several configuration options can be offered by the data masking providers to support various types of workloads.

In one embodiment each local VM 52 that holds data records to be exported (along with the quasi-identifying information associated with these records) applies a data anonymization algorithm to the corresponding records. The data anonymization algorithm enforces selected data generalization and suppression of the quasi-identifying attributes in the to-be-released data records to guarantee k-anonymity (also l-diversity, if requested). After being anonymized, each batch of records is exported.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 5:
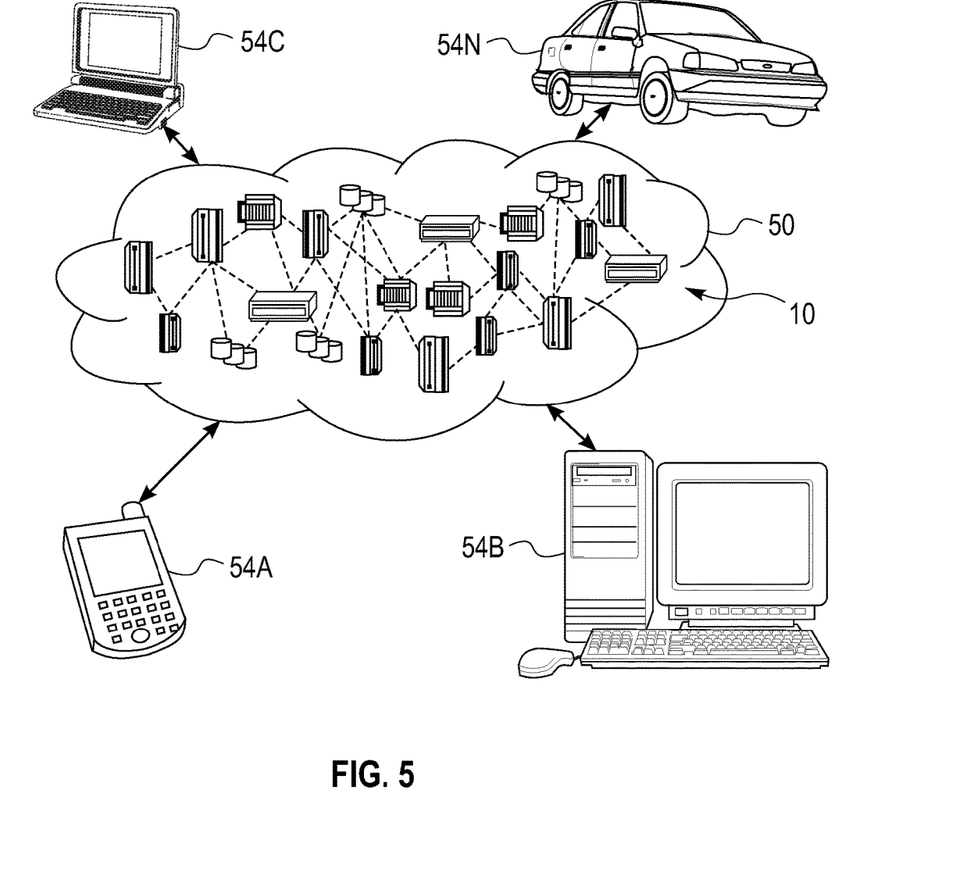
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
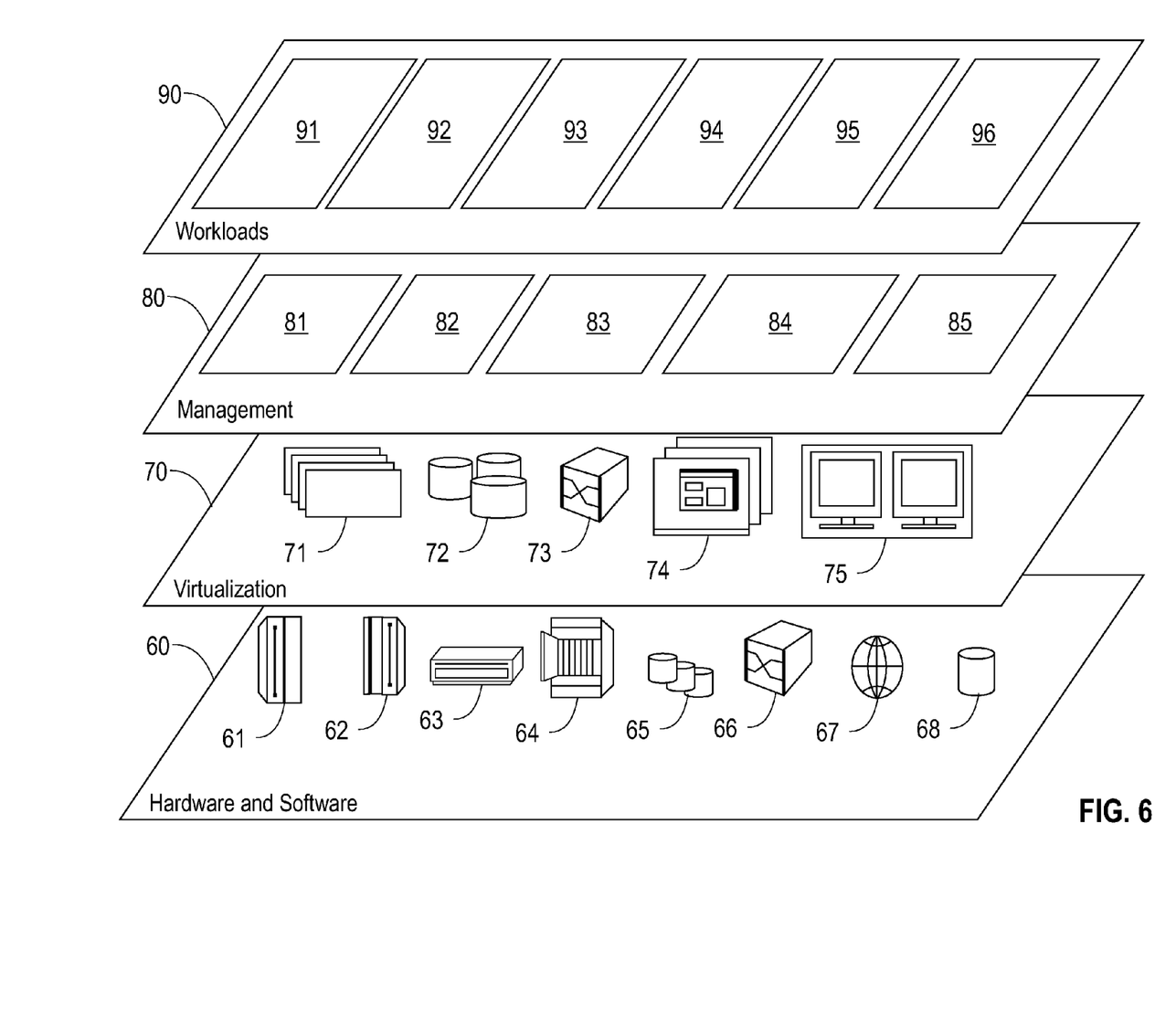
FIG. 6 depicts abstraction model layers according to an embodiment of the present invention.
Figure 7:
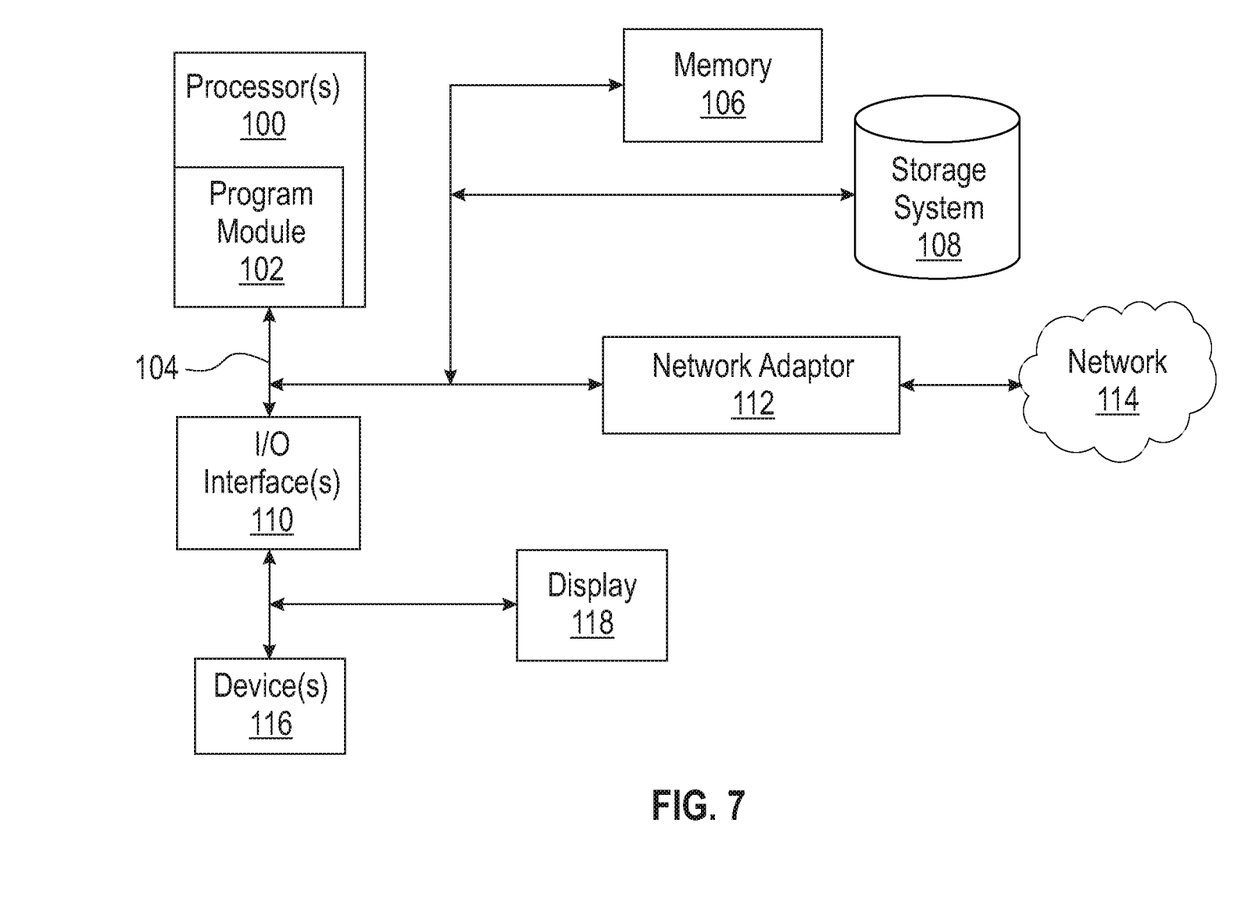
FIG. 7 is a block diagram of an exemplary computing system suitable for implementation of the embodiments of the invention disclosed in this specification.

Referring now to FIG. 6, a set of functional abstraction layers provided by cloud computing environment 50 (FIG. 5) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and order fulfillment deciding 96.

FIG. 7 illustrates a schematic of an example computer or processing system that may implement the method for automatically identifying and protecting privacy vulnerabilities in a plurality of data streams of data records received by a plurality of virtual machines in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A method for automatically identifying and protecting privacy vulnerabilities in a plurality of data streams of data records received by a plurality of virtual machines, the method comprising:
   receiving at least one data stream at each local virtual machine, the data stream including data values for a plurality of attributes;
   indexing the data values for each attribute of the at least one data stream received by each local virtual machine based on a schema of each data stream;
   integrating by a main virtual machine the local virtual machine indexes into a global index data structure for the plurality of data streams, the global index data structure including single attribute data values;
   identifying privacy vulnerabilities in the data as:
      attributes that are direct identifiers based on the attribute data values stored in the global index data structure;
      combinations of attributes that are quasi-identifiers based on the low frequency of certain combinations of attribute data value pairs by computing the frequency based on the single attribute data values stored in the global index data structure; and
      providing privacy protection to the data streams by applying data transformations on the discovered direct identifiers and the quasi-identifiers.

2. The method of claim 1, further including classifying the data attributes of the plurality of data streams into known data types, the classification being performed either before identifying the privacy vulnerabilities in the data, or after identifying the privacy vulnerabilities in the data.

3. The method of claim 2, wherein the privacy protection for the direct identifiers in the data stream is provided by applying relevant masking providers to the data based on the data type to which they were assigned in the data type classification.

4. The method of claim 1, wherein the privacy protection for the quasi-identifiers in the data stream is provided by data generalization and data suppression operations applied on batches of data records held by different local virtual machines.

5. The method of claim 1, wherein each local virtual machine receives incoming data from a data stream on a per-record basis and the data streams are split into attribute-value pairs.

6. The method of claim 1, further including updating the global index data structure by one of: (a) each local virtual machine issuing an update request every time it reads one or more data values, (b) each local virtual machine issuing an update request every time it reads one or more data records, (c) each local virtual machine issuing an update request for one or more read data values that are associated with counters that have values below a certain threshold k, and (d) at a time a data export has been requested, the main virtual machine requesting the local indexes from all local virtual machines to update the global index data structure before initiating the data export.

7. The method of claim 2, wherein the classification includes a set of classifiers, each classifier recognizing a specific data type to which a data value may belong and selecting a preference order for testing an incoming data value against different known specific data types, based on the specific data type that was selected previously for a data value of the same schema and attribute.

8. The method of claim 1, further including assigning each of the local virtual machines a set of attributes belonging to a schema, providing to each local virtual machine access to the part of the global index data structure corresponding to the assigned attributes, and computing by each local virtual machine the direct identifiers and quasi-identifiers that are related to the corresponding attributes.

9. A system comprising:
   at least one data processor connected to at least one memory that stores software instructions, where execution of the software instructions by the at least one data processor causes the system to automatically identify and protect privacy vulnerabilities in a plurality of data streams of data records received by a plurality of virtual machines by:
      receiving at least one data stream at each local virtual machine, the data stream including data values for a plurality of attributes;
      indexing the data values for each attribute of the at least one data stream received by each local virtual machine based on a schema of each data stream;
      integrating by a main virtual machine the local virtual machine indexes into a global index data structure for the plurality of data streams, the global index data structure including single attribute data values;
      identifying privacy vulnerabilities in the data as:
   attributes that are direct identifiers based on the attribute data values stored in the global index data structure;
      combinations of attributes that are quasi-identifiers based on the low frequency of certain combinations of attribute data value pairs by computing the frequency based on the single attribute data values stored in the global index data structure; and
      providing privacy protection to the data streams by applying data transformations on the discovered direct identifiers and the quasi-identifiers.

10. The system of claim 9, further including classifying the data attributes of the plurality of data streams into known data types, the classification being performed either before identifying the privacy vulnerabilities in the data, or after identifying the privacy vulnerabilities in the data.

11. The system of claim 9, wherein each local virtual machine receives incoming data from a data stream on a per-record basis and the data streams are split into attribute-value pairs and further including examining each pair of attributes that are not direct identifiers in the data for rare combinations of their respective values, progressively extending the pairs of attributes that are examined to include an additional attribute from the data that is not a direct identifier until all possible attribute combinations have been examined and identifying the pairs of attributes that contain rare combinations of attribute-value pairs as quasi-identifiers.

12. The system of claim 10, wherein the privacy protection for the direct identifiers in the data stream is provided by applying relevant masking providers to the data based on the data type to which they were assigned in the data type classification, and wherein the privacy protection for the quasi-identifiers in the data stream is provided by data generalization and data suppression operations applied on batches of data records held by different local virtual machines performed in a principled way following a formal privacy model.

13. The system of claim 9, further including updating the global index data structure by one of: (a) each local virtual machine issuing an update request every time it reads one or more data values, (b) each local virtual machine issuing an update request every time it reads one or more data records, (c) each local virtual machine issuing an update request for one or more read data values that are associated with counters that have values below a certain threshold k, and (d) at a time a data export has been requested, the main virtual machine requesting the local indexes from all local virtual machines to update the global index data structure before initiating the data export.

14. The system of claim 10, wherein the classification includes a set of classifiers, each classifier recognizing a specific data type to which a data value may belong and selecting a preference order for testing an incoming data value against different known specific data types, based on the specific data type that was selected previously for a data value of the same schema and attribute.

15. The system of claim 9, further including assigning each of the local virtual machines a set of attributes belonging to a schema, providing to each local virtual machine access to the part of the global index data structure corresponding to the assigned attributes, and computing by each local virtual machine the direct identifiers and quasi-identifiers that are related to the corresponding attributes.

16. A computer program product comprising:
    software instructions on a non-transitory computer-readable medium, where execution of the software instructions using a computer causes the computer to automatically identify and protect privacy vulnerabilities in a plurality of data streams of data records received by a plurality of virtual machines by:
       receiving at least one data stream at each local virtual machine, the data stream including data values for a plurality of attributes;
       indexing the data values for each attribute of the at least one data stream received by each local virtual machine based on a schema of each data stream;
       integrating by a main virtual machine the local virtual machine indexes into a global index data structure for the plurality of data streams, the global index data structure including single attribute data values;
       identifying privacy vulnerabilities in the data as:
          attributes that are direct identifiers based on the attribute data values stored in the global index data structure;
          combinations of attributes that are quasi-identifiers based on the low frequency of certain combinations of attribute data value pairs by computing the frequency based on the single attribute data values stored in the global index data structure;
       providing privacy protection to the data streams by applying data transformations on the discovered direct identifiers and the quasi-identifiers; and
       classifying the data attributes of the plurality of data streams into known data types, the classification being performed either before identifying the privacy vulnerabilities in the data, or after identifying the privacy vulnerabilities in the data.

17. The computer program product of claim 16, wherein each local virtual machine receives incoming data from a data stream on a per-record basis and the data streams are split into attribute-value pairs and further including examining each pair of attributes that are not direct identifiers in the data for rare combinations of their respective values, progressively extending the pairs of attributes that are examined to include an additional attribute from the data that is not a direct identifier until all possible attribute combinations have been examined and identifying the pairs of attributes that contain rare combinations of attribute-value pairs as quasi-identifiers.

18. The computer program product of claim 16, wherein the privacy protection for the direct identifiers in the data stream is provided by applying relevant masking providers to the data based on the data type to which they were assigned in the data type classification, and wherein the privacy protection for the quasi-identifiers in the data stream is provided by data generalization and data suppression operations applied on batches of data records held by different local virtual machines performed in a principled way following a formal privacy model.

19. The computer program product of claim 16, further including updating the global index data structure by one of: (a) each local virtual machine issuing an update request every time it reads one or more data values, (b) each local virtual machine issuing an update request every time it reads one or more data records, (c) each local virtual machine issuing an update request for one or more read data values that are associated with counters that have values below a certain threshold k, and (d) at a time a data export has been requested, the main virtual machine requesting the local indexes from all local virtual machines to update the global index data structure before initiating the data export.

20. The computer program product of claim 16, wherein the classification includes a set of classifiers, each classifier recognizing a specific data type to which a data value may belong and selecting a preference order for testing an incoming data value against different known specific data types, based on the specific data type that was selected previously for a data value of the same schema and attribute, and further including assigning each of the local virtual machines a set of attributes belonging to a schema, providing to each local virtual machine access to the part of the global index data structure corresponding to the assigned attributes, and computing by each local virtual machine the direct identifiers and quasi-identifiers that are related to the.

* * * * *